July 23, 1974    J. R. MUENGER    3,825,501
EXOTHERMIC REACTION PROCESS
Filed Dec. 17, 1971
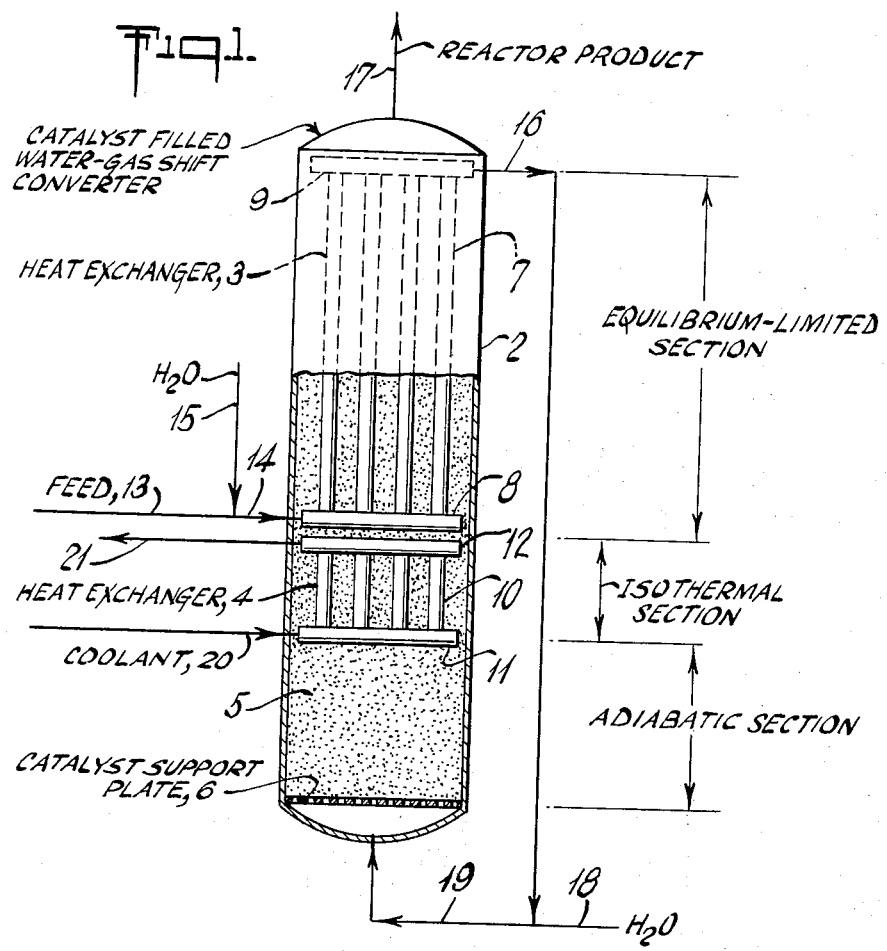

United States Patent Office 3,825,501
Patented July 23, 1974

3,825,501
EXOTHERMIC REACTION PROCESS
James R. Muenger, Beacon, N.Y., assignor to
Texaco Inc., New York, N.Y.
Continuation-in-part of application Ser. No. 880,254, Nov. 26, 1969, now Patent No. 3,666,682. This application Dec. 17, 1971, Ser. No. 209,238
The portion of the term of the patent subsequent to
May 30, 1989, has been disclaimed
Int. Cl. C01b 2/06
U.S. Cl. 252—373                     6 Claims

ABSTRACT OF THE DISCLOSURE

A stream of fluid reactants is passed through catalyst wherein the reactants undergo a temperature controlled exothermic reaction so as to produce maximum conversion. The temperature of the reacting stream is controlled by two separate streams of coolants which are separately passed through two separate heat exchangers embedded in said catalyst in concurrent flow and indirect heat exchange with the reacting stream. The first stream of coolant may be water or an organic liquid from an external source. The second stream of coolant is a portion of unreacted feedstream before it is introduced into the catalyst where it undergoes exothermic reaction as previously described.

This application is a continuation-in-part of copending coassigned application Ser. No. 880,254, filed Nov. 26, 1969 by James R. Muenger, now U.S. Pat. 3,666,682.

BACKGROUND OF THE INVENTION

Field of the Invention

This invention relates to a temperature controlled exothermic reaction process. In one of its more specific aspects, it relates to a process for producing synthesis gas rich in hydrogen from a carbon monoxide-containing gaseous feedstream by an improved catalytic water-gas shift conversion process.

Description of the Prior Art

In prior art processes which involve exothermic catalytic gas phase reactions, the surplus reaction heat is often conducted away by techniques such as: cooling the catalyst or gas by external cooling of the reactant gas between beds by indirect heat exchange; directly introducing water or some other coolant into the space between the catalyst beds; and preheating the feed gas by indirect heat exchange with the product gas in an external heat exchanger. The disadvantages of said prior art procedures include: non-optimum temperature control of the reaction, excessive use of catalyst, excessive volume of the reactor, decreased conversion, and the need for and expense of external heat exchange.

The catalytic water-gas shift conversion reaction is a well known exothermic reaction which is widely used for the manufacture of hydrogen and ammonia synthesis gas. It is also commonly used in processes for producing feedstock streams of gaseous mixtures of hydrogen and carbon monoxide for use in the chemical synthesis of oxygen containing organic compounds.

The water-gas shift reaction is represented stoichiometrically as follows:

$$CO + H_2O = CO_2 + H_2 \qquad (1)$$

About 16,700 B.t.u.s are liberated for each pound mole of CO converted. Heat removal and temperature control are therefore necessary to prevent destruction of the catalyst and to attain the desired CO conversion. Ordinarily, the reaction temperature is held in the range of 350 to 1050° F. (depending upon the catalyst used) by employing two or three separate fixed beds of catalyst. The shifted gases from one bed may be passed through an external heat exchanger and cooled from a high temperature to a comparatively low temperature before being introduced into the next bed.

In such conventional systems the exit temperature from the last bed is not the minimum shifted gas temperature in the system, as it should be from ideal considerations for achieving maximum CO conversion. Further, reaction rates are slow at the beginning of each bed, since the bed temperature is lowest at that point. These disadvantages and others found with conventional shift converters are overcome by the process of my invention.

SUMMARY OF THE INVENTION

This is a continuous exothermic chemical reaction process within a reaction vessel containing catalyst comprising the steps of:

(1) Preheating, within the first section of a reaction vessel comprising three contiguous sections, an unreacted gaseous feedstream comprising a mixture of reactants by passing said feedstream as a coolant through a first heat-exchange unit embedded in catalyst in said first section in concurrent flow and indirect heat exchange with a reacting portion of said feedstream ascending from the second section of said reaction vessel and passing through the catalyst on the outside of said first heat-exchange unit while undergoing additional exothermic reaction, thereby gradually reducing the temperature of the reacting feedstream in said first section, while gradually increasing the temperature of the unreacted gaseous feedstream;

(2) Discharging from the reaction vessel a product gas stream leaving from the top of the catalyst in the first section in step (1);

(3) Introducing the preheated unreacted feedstream leaving the first heat-exchange unit in step (1) into catalyst in the third section located immediately below the second heat-exchange unit in said reaction vessel and adiabatically reacting together therein reactants in said feedstream thereby increasing the temperature of said reacting feedstreams preferably to a maximum that the catalyst may withstand for an extended period of operation, e.g., longer than about 2000 hours;

(4) Passing the reacting gas stream leaving step (3) through the catalyst in the second section on the outside of and surrounding said second heat-exchange unit in concurrent flow and indirect heat exchange with a stream of coolant from an external source which is passed through said second heat-exchange unit, whereby the temperature of said stream of reacting gas in said second section is maintained substantially constant over the entire length of said second section and while simultaneously the temperature of said stream of coolant is gradually increased; and (5) Introducing the reacting gas stream leaving the catalyst in the second section in step (4) into the catalyst in the first section in step (1), as previously described in step (1).

One embodiment of the invention consists of the water-gas shift conversion process for producing a gaseous mixture of hydrogen and carbon dioxide from a CO rich feed gas. The temperature profile of the reactants passing through the shift converter in contact with the catalyst is successively controlled through an adiabatic section where the temperature of the feed gases increase to a desired maximum, an isothermal section where said maximum temperature is maintained to achieve a rapid reaction rate, and an equilibrium-limited section where the temperature is reduced exponentially until the product gas leaves the shift converter at the desired CO conversion and desired minimum exit temperature. By the process of my invention, the volume of catalyst required for a given conversion of CO to $CO_2$ may be minimized.

DESCRIPTION OF THE INVENTION

The present invention pertains to a liquid or gas phase exothermic catalytic reaction in which the temperature profile is controlled to yield maximum conversion with a minimum quantity of catalyst. The process is applicable to all reactions which have the following characteristics: the reaction is exothermic; kinetics are favored by high temperatures; feed-heating and product-cooling are desired or permissible in the overall process; a maximum-permissible catalytic temperature may be imposed upon the process; and a separate coolant stream from an external source is available to assume a portion of the cooling load. Typical processes which are applicable include: water-gas shift reaction to produce hydrogen and carbon dioxide from carbon monoxide and steam; methane synthesis; and hydrogenation of hydrocarbons.

Le Chatelier's principle states that in exothermic reactions equilibrium composition shifts toward completion of the reaction as temperature decreases. However, the kinetics of the reaction are favored by high temperatures. The maximum temperature is established by the thermal resistance of the catalyst. In the subject process the reacting stream is successively preheated within the catalyst chamber, raised to a maximum temperature to increase the reaction rate, and then gradually lowered in temperature to increase the degree of conversion. The present scheme provides for net cooling beyond that which can be effected by the feed and by additions to the feedstream. Two separate coolants in two separate heat exchangers are provided in the reactor. Parallel concurrent flow is employed in both heat exchangers between the cold and hot streams. Further, the heat exchange between the cold and hot stream is indirect. The term indirect heat exchange applies to non-contact heat exchange between the feedstream flowing within a heat exchanger and the stream reacting and passing up through the catalyst on the outside of the heat exchanger that is on the shell side. Similarly, there is indirect or non-contact heat exchange between a coolant stream from an external source such as water or an organic liquid which is introduced into a separate second heat exchanger within the reactor and the stream reacting and passing up through the catalyst surrounding the second heat exchanger.

A preferred embodiment of the present invention pertains to a novel continous water-gas shift conversion process for reacting a CO-rich feed gas and $H_2O$ together to produce hydrogen and carbon dioxide. By this process, about 70 mole percent or more of the CO in the CO-rich feed gas may be converted to $CO_2$.

The process involves forming a CO-rich water-gas shift feed-stream comprising CO and $H_2O$. For example, supplemental $H_2O$ in the form of liquid phase water or steam may be added to synthesis gas. The shift feedstream, preferably at a temperature in the range of 300 to 620° F. and at a preferable mole ratio ($H_2O/CO$) in the range of about 2 to 5 is then introduced as a heat exchange fluid or coolant into the first heat exchanger. The heat exchanger may be of conventional design such as a tube coil or tube bundle. The heat exchanger is embedded in a water-gas shift catalyst, preferably contained in a single elongated cylindrical vessel. In the bed of catalyst there are three contiguous temperature controlled sections referred to as the adiabatic, isothermal, and equilibrium-limited sections.

The feedstream is introduced into a first heat exchanger embedded in catalyst in the equilibrium limited section of the reactor. The shift feed stream is heated, preferably to an exit temperature in the range of about 380 to 760° F. by absorbing heat from a gas stream undergoing exothermic reaction within said catalyst. Supplemental $H_2O$ may be added to the unreacted shift feedstream entering or leaving the first heat exchanger. Preferably at substantially the same exit temperature as it leaves the first heat exchanger, the preheated unreacted feedstream is then passed into a fixed bed of water-gas shift catalyst in the adiabatic section of the catalyst bed.

In the adiabatic section of the catalyst bed, the temperature of the entering shift feedstream is quickly raised to the desired maximum operating temperature by the heat of reaction of the exothermic water-gas shift. This temperature is the maximum temperature that the catalyst will withstand continuously without excessive loss of activity. The maximum continuous operating temperature for a conventional iron oxide-chromium oxide shift catalyst is about 930° F. Higher temperatures may be reached with other shift catalysts.

The reacting shift feedstream leaving the adiabatic section at a temperature in the range of about 600 to 950° F. is then passed through the catalyst in the isothermal section of the catalyst bed at substantially the same exit temperature as it had when it left said adiabatic section. A second heat exchanger is embedded in the catalyst in said isothermal section. $H_2O$ in the form of steam, liquid water or other fluid coolant such as a liquid hydrocarbon from an external source is introduced into said second heat exchanger in concurrent flow heat exchange with said reacting feedstream so as to maintain said reacting feedstream at a constant temperature through said isothermal section.

The reacting gases leave the isothermal section and at substantially the same exit temperature therefrom are passed into the catalyst on the shell side of the first heat exchanger which was previously referred to as the equilibrium-limited section. The water-gas shift reaction continues in said section at a reduced rate due to the lower temperature and reduced concentration of CO. The amount of CO conversion is facilitated in this last section before discharge by progessively lowering the temperature of the reactants along the length of the section as a function of CO concentration. At any specific point along the length of the equilibrium limited section, the actual temperature of the feed gas is held in the range of about 20–160° F. and preferably 50° F. lower than the apparent equilibrium temperature corresponding to the equilibrium constant for the composition of the reacting feed gas at that point. The temperature of the product gas leaving the equilibrium-limited section, and discharged from the reactor, is preferably in the range of about 400 to 780° F.

The shift feedstream at its lowest temperature enters the aforesaid first heat exchanger at the beginning of the equilibrium-limited section and flows through the heat exchanger concurrent to the direction of flow of reactants in the reactor catalyst bed. Thus, the maximum temperature differences between the feedstream coolant and the catalyst bed are available at the region requiring the greatest heat flux, and the temperature difference decreased downstream just as does the required heat flux. Similarly, the largest temperature difference in the second heat exchanger located in the isothermal section is at the entrance where the heat flux requirement is greatest.

The heat transfer requirements in both the isothermal and the equilibrium-limited sections may be shown to be of an exponentially decreasing function versus length. These requirements are matched by indirect concurrent flow heat transfer between the gases undergoing water-gas shift reaction and the coolant. In the preferred embodiment of my invention the coolant in the equilibrium controlled section comprises a continuous stream of comparatively cooler feed gas plus minor amounts of supplemental $H_2O$ if necessary. Thus the feed gas mixture is heated by the reacting feed gas which it cools, at a decided economic advantage. Further, a costly external heat exchanger is avoided. Alternately, the coolant streams in the first and second heat exchangers may be interchanged. A typical temperature profile for the gases undergoing shift reaction along the length of the shift converter is shown in FIG. 2 of the drawing.

In a preferred embodiment, the water-gas shift reaction takes place in a catalyst filled plug-flow shift converter comprising a vertical elongated cylindrical shaped pressure vessel or shell. As the catalytic reaction takes place, the temperature varies over the range of about 300 to 1100° F. and preferably in the range of about 400 to 950° F. The pressure is in the range of about 1 to 350 atmospheres, for example 5 to 200 atmospheres, and preferably in the range of 10 to 160 atmospheres. Two separate heat exchangers embedded in catalyst are axially disposed within the shell of the shift converter. The heat exchangers divide the shift converter longitudinally into the three previously mentioned sections for controlling the temperature of the reacting gases. These sections are contiguous and provide along the length of each section a predetermined temperature profile. Catalyst fills all of the space within the refractory lined shell that is not otherwise occupied by the heat exchangers. The pressure in all three sections is substantially the same, less normal minor pressure drop.

The flow of the reactants longitudinally through the reactor on the shell side of the heat exchangers is orderly with "nonbackmix," i.e. no element of fluid overtaking any other element, also referred to as "plug flow." The residence time in the reactor is the same for all elements of the fluid.

Any suitable gas to gas heat exchanger may be used. For example, a suitable tubular heat exchanger is shown in FIG. 1 and will be further described. A preferred water-gas shift converter is depicted in coassigned copending application Ser. No. 209,267, filed concurrently herewith.

The composition of the feed gas to the process may comprise from about 5 to 90 mole percent of CO on a dry gas basis and preferably 20 to 50 mole percent of CO on a dry gas basis. Feed gas to the process may be derived from any of the many well known gasification processes such as by the partial oxidation of a hydrocarbon fuel at a temperature in the range of about 1700 to 3000° F. and preferably about 1800 to 2800° F. and a pressure in the range of 1 to 350 atmospheres and preferably about 5 to 200 atmospheres. Other suitable feedstocks include water gas and the product gas from steam reforming hydrocarbons.

Conventional water-gas shift conversion catalysts may be employed in the process of our invention. For example, over a temperature range of about 600 to 1050° F. a suitable catalyst comprises iron oxide promoted by 1 to 15 percent by weight of an oxide of a metal such as chromium, thorium, uranium, beryllium and antimony. This catalyst is characterized by heat stability (up to 1184° F.), high activity, good selectivity, resistance to poisoning, constant volume, and long life. For low temperature shift reactions over a temperature range of about 350 to 650° F. the catalyst may comprise mixtures of copper and zinc salts or oxides in a weight ratio of about 3 parts zinc to 1 part copper. Catalyst may be obtained in the form of pellets or irregular fragments that range in size from about 5 to 10 mm. and larger, or tablets ranging from ¼ in. to ⅜" diameter.

DESCRIPTION OF THE DRAWING AND EXAMPLE

A more complete understanding of the invention may be had by reference to the accompanying drawing which depicts in FIG. 1 for a specific set of operating conditions and feed gas composition, a diagrammatic representation of a suitable shift converter in connection with a process flow diagram for one embodiment of the previously described process. In FIG. 2, a graphical representation is shown of the temperature profile of the reacting feed gas stream along the length of the shift converter.

Although the drawing illustrates a preferred embodiment of the process of this invention, it is not intended to limit the invention to the particular apparatus or materials described. Quantities have been assigned to the various streams so that the following description of the drawing also serves as an example of the invention.

Twenty-five million standard cubic feet per day (MM s.c.f.d.) of hydrogen are produced by the process of my invention in catalyst filled fixed bed water-gas shift converter 1, as shown in FIG. 1 of the drawing. Water-gas shift converter 1 functions as a plug flow reactor. The temperature profile of the reactant feed gas mixture passing longitudinally through the shell side of shift converter 1 and undergoing water-gas shift reaction is depicted in FIG. 2 of the drawing.

Water-gas shift converter 1 comprises a vertical steel pressure vessel 2 approximately 8.5 feet in diameter by 48 feet high containing separate axially aligned upper heat exchanger 3 and lower heat exchanger 4. As shown in the broken-away section of vessel 2, the space which is unoccupied by heat exchangers 3 and 4 is completely filled with conventional water-gas shift catalyst 5. The total amount of shift catalyst in this example comprises 1556 cubic feet of a mixture of iron oxide (85 to 95 weight percent) and chromium oxide (5 to 15 weight percent). The catalyst is in the form of pellets ⅜" diameter by ³⁄₁₀" thick and is supported off the bottom of vessel 2 by perforated plate 6.

Although not shown in the drawing, pressure vessel 2 is jacketed with a suitable thermal insulation e.g. rock wool or diatomaceous silica plus asbestos fiber so as to reduce heat loss to a negligible quantity.

Upper heat exchanger 3 in this example has a total area of approximately 4500 square feet and comprises a bundle of 640 vertical and parallel alloy steel tubes 7. Each tube has an inside diameter of 1.032 inches, a wall thickness of 0.109 inches and a length of 26.5 feet. Tubes 7 are fed by lower header 8 and discharge into upper header 9.

Lower heat exchanger 4 in this example is similar in design to upper heat exchanger 3 but has a total area of approximately 760 square feet and comprises a bundle of 640 vertical and parallel alloy steel tubes 10. Each tube has an inside diameter of 1.032 inches, a wall thickness of 0.109 inches, and a length of 4.5 feet. Tubes 10 are fed by header 11 and discharge into header 12.

For temperature control, water-gas shift converter 1 may be considered as being divided into three contiguous sections respectively called adiabatic, isothermal and equilibrium-limited. The adiabatic section comprises the space bounded by perforated catalyst support plate 6 and header 11 and has a volume of catalyst $V_1$ as shown in FIGS. 1 and 2. The isothermal section comprises the space occupied by heat exchanger 4 and has a volume of catalyst $V_2-V_1$. The equilibrium-limited section comprises the space occupied by heat exchanger 3 and has a volume of catalyst $V_3-V_2$. Further, the volumetric relationship between these three sections in this example is approximately as follows:

$$V_1:V_2-V_1:V_3-V_2=1:0.45:2.56$$

29.3 million standard cubic feet per day (MM s.c.f.d.) of saturated water-gas shift feedstream (dry basis) in line 13 at a temperature of 411° F. and a pressure of 515 p.s.i.g. and having the composition as shown in Table I are mixed in line 14 with 2.48 thousand pounds per day of liquid water from line 15 at a temperature of 411° F. and a pressure of 600 p.s.i.g.

The feed gas-water mixture in line 14 at a temperature of 411° F. is introduced into lower header 8 of upper heat exchanger 3. As the feed gas-water mixture flows up through tubes 7 and into upper header 9 it comes in noncontact concurrent indirect heat exchange with partially shifted gas which enters the catalyst filled shell side of heat exchanger 3 from the shell side of the isothermal section below at a temperature of about 930° F. and which then passes up through the shell side of the equilibrium-limited section.

The temperature of the feed gas-water mixture within tubes 7 increases exponentially as it passes up through heat exchanger 3 by absorbing the heat from the reactant gases undergoing water-gas shift reaction on the shell side of heat exchanger 3. This heat comprises the sensible heat in the reactant gases and the heat released by the exothermic shift reaction. Vaporization of any atomized liquid water in the feed gas mixture within the tubes of heat exchanger effectively reduces the temperature of the reactant gases in the initial portion of the equilibrium-limited section where the highest heat flux is desired. The temperature of the reacting gases are reduced exponentially as they pass through the equilibrium-limited section.

The preheated feed gas is removed at a temperature of 660° F. from header 9 of heat exchanger 3 through line 16 near the top of shift converter 1. Simultaneously, the cooled shifted product gas is removed from shift converter 1 through line 17 at the top of the column. An analysis of the shifted product gas is shown in Table I.

Superheated steam is added to the feed gas by way of line 18. This steam may be obtained from part of the flow of line 21 at a pressure of 600 p.s.i.g. and a temperature of 915° F. in the amount shown in Table I. The preheated and humidified feed gas mixture in line 19 at a temperature of about 695° F. or substantially the same temperature as the gas stream leaving header 9 is introduced into the bottom of shift converter 1 on the shell side below perforated catalyst support plate 6. The preheated feedstream successively flows up through the catalyst in the adiabatic and isothermal sections of the shift converter, finally being discharged from line 17 at the top of shift converter as shifted product gas. $H_2O$ and $CO$ in the gas stream passing through the catalyst react with each other by the water-gas shift reaction to produce $H_2$ and $CO_2$.

There is no cooling of the reacting gas stream in the adiabatic section and as the reactant feed gas passes up through the catalyst filled adiabatic section its temperature is increased exponentially to 930° F. by the heat of reaction from the water-gas shift reaction. The volume of catalyst and the composition and inlet temperature of the reactant feed gas helps to control the maximum temperature in the adiabatic section to 930° F. Destruction of the catalyst is thereby prevented. The reacting stream of gas enters and leaves the catalyst in the isothermal section at substantially the same temperature as the exit temperature at which it leaves the adiabatic section. Although, the partially shifted reactant gas passes up through the catalyst on the shell side of the isothermal section while undergoing exothermic water-gas shift reaction, the temperature of the reacting gas stream is held constant by heat exchange with a separate coolant stream. This is accomplished by passing a coolant (a supplemental stream of water, steam, liquid hydrocarbon, or other fluid coolant from an external source) through heat exchanger 4 in concurrent flow and indirect heat exchange with the reacting gas stream passing on the outside of the heat exchanger 4. For example, steam at a temperature of 600° F. and a pressure of 600° p.s.i.g. in line 20 is introduced into lower header 11 of heat of heat exchanger 4. As the steam flows up through tubes 10 and into upper header 12, it comes in noncontact i.e. indirect, concurrent flow heat exchange with partially shifted reactant gas which enters the catalyst filled shell side of heat exchanger 4 from the catalyst filled adiabatic section below at a temperature of about 930° F.

The temperature of the coolant fluid in tubes 10 increases exponentially as it passes up through heat exchanger 4 by absorbing the sensible heat from the concurrent reactant gases on the shell side of heat exchanger 4 as well as by absorbing heat released by the exothermic catalytic shift reaction taking place on the shell side. Thus, temperature of the gas undergoing shift reaction in the isothermal section is held constant, while the temperature of the coolant stream increases to a temperature in the range of about 600 to 915° F. The coolant stream is then removed from heater exchanger 4 through line 21 and is used as process steam and for power or heat.

A summary of the operating characteristics and the composition of the streams are shown in Table I along with for comparison in Table II the values for a conventional water-gas shift converter utilizing three fixed beds of catalyst and interbed cooling to process the same quantity of feed gas at the same CO conversion.

From Tables I and II it is apparent that in comparison with conventional process, by the process of my invention the same quantity of product gas can be produced having the same analysis but employing less catalyst, generating useful steam, and not requiring an external feed heat exchanger. This means that the size of the shift converter may be reduced about 20 percent in addition to the savings in catalyst and external heat exchanger.

The process of the invention has been described generally and by examples, with reference to materials of particular composition for purposes of clarity and illustration only. It will be apparent to those skilled in the art from the foregoing that various modifications of the process and materials disclosed herein can be made without departure from the spirit of the invention.

TABLE I.—SHIFT CONVERSION PROCESS AS SHOWN IN FIG. I

| | Feed gas | | | | Reactant gas from— | | Product gas from equilibrium-limited section | Overall |
|---|---|---|---|---|---|---|---|---|
| | Line 13 | Plus $H_2O$, Line 14 | Line 16 | Plus $H_2O$, Line 19 | Adiabatic section | Isothermal section | | |
| Reactor volume, cu. ft. | | | | | | | | 2,960 |
| Catalyst volume, cu. ft. | | | | | 387 | 175 | 994 | |
| Temperature, °F. | 411 | 411 | 660 | 695 | 930 | 930 | 675 | |
| Pressure, p.s.i.g. | 515 | 515 | 512 | 512 | | | | |
| Gas composition mole percent feed, dry basis: | | | | | | | | |
| CO | 48.7 | 48.7 | 48.7 | 48.7 | 15.8 | 8.8 | 4.7 | |
| $CO_2$ | 3.8 | 3.8 | 3.8 | 3.8 | 36.7 | 43.7 | 47.8 | |
| $H_2$ | 45.8 | 45.8 | 45.8 | 45.8 | 78.7 | 85.7 | 89.8 | |
| Inerts | 1.7 | 1.7 | 1.7 | 1.7 | 1.7 | 1.7 | 1.7 | |
| $H_2O$ | 115.0 | 119.5 | 119.5 | 15.3 | 118.4 | 111.4 | 107.3 | |
| $H_2O/CO$, mole ratio | 2.4 | 2.5 | 2.5 | 3.1 | 7.5 | 12.7 | 22.8 | |
| $H_2O$ added, percent mole | | 4.5 | | 31.8 | | | | |
| Dry feed, space velocity, s.c.f.h. | | | | | 3120 | 6910 | 1215 | 778 |
| Dry feed/ft.³ cat. conversion, percent mole, CO in dry feed | | | | | 67.6 | 81.9 | 90.4 | 90.4 |

TABLE II.—CONVENTIONAL SHIFT CONVERSION PROCESS

|  | Feed | Inlet 1st bed | Outlet 1st bed | Inlet 2d bed | Outlet 2d bed | Inlet 3d bed | Product gas | Overall |
|---|---|---|---|---|---|---|---|---|
| Reactor Volume, cu. ft. |  |  |  |  |  |  |  | 3,390 |
| Catalyst volume, cu. ft. |  | 240 |  | 430 |  | 1,182 |  | 1,852 |
| Temperature, °F | 411 | 708 | 930 | 786 | 899 | 722 |  |  |
| Pressure, P.s.i.g. | 510 | 501 |  |  |  |  | 486 |  |
| Gas composition mole percent feed, dry basis: |  |  |  |  |  |  |  |  |
| CO | 48.7 | 58.7 | 23.3 | 23.3 | 9.1 | 9.1 | 4.7 |  |
| $CO_2$ | 3.8 | 3.8 | 29.2 | 29.2 | 43.4 | 43.4 | 47.8 |  |
| $H_2$ | 45.8 | 45.8 | 71.2 | 71.2 | 85.4 | 85.4 | 89.8 |  |
| Inerts | 1.7 | 1.7 | 1.7 | 1.7 | 1.7 | 1.7 | 1.7 |  |
| $H_2O$ | 115.0 | 115.0 | 89.6 | 105.1 | 90.9 | 111.7 | 107.3 |  |
| $H_2O/CO$ mole ratio | 2.4 | 2.4 | 3.9 | 4.5 | 10.0 | 12.3 | 23.0 |  |
| $H_1O$ added, percent Mole |  |  | 15.5 |  | 20.8 |  |  | 36.3 |
| Dry feed, space velocity s.c.f.h. |  |  | 5020 | 2815 |  | 1024 |  | 653 |
| Dry feed/ft.³ cat. conversion, percent mole CO in dry feed |  |  | 52.2 |  | 81.3 |  | 90.4 | 90.4 |

I claim:

1. A water-gas shift conversion process at a pressure in the range of about 1 to 350 atmospheres comprising
   (1) preheating a gaseous feedstream comprising a CO-rich gas comprising 5 to 90 mole percent of CO on a dry gas basis and $H_2O$ to a temperature in the range of about 380° to 760° F. by passing said unreacted gaseous feedstream as a coolant through a first heat exchange unit embedded in water-gas shift catalyst in a water-gas shift conversion zone that is filled with water-gas shift catalyst and comprising an equilibrium-limited section, an isothermal section contiguous to said equilibrium-limited section, and an adiabatic section contiguous to said isothermal section, and wherein said first heat exchange unit is located in said equilibrium-limited section;
   (2) partially reacting the preheated gaseous feedstream from (1) at a temperature in the range of about 300 to 1100° F. over the water-gas shift catalyst in said adiabatic section to produce hydrogen and carbon dioxide;
   (3) introducing the partially reacted gaseous stream leaving the catalyst in (2) at substantially the same exit temperature as from (2) into the water-gas shift catalyst in the isothermal section and continuing the exothermic water-gas shift reaction of said gaseous stream as it passed through said isothermal section;
   (4) passing a separate stream of coolant from an external source through a second heat exchange unit embedded in the water-gas shift catalyst in said isothermal section in concurrent flow indirect heat exchange with the reacting gaseous stream passing through the catalyst in (3), thereby keeping the temperature of said reacting gaseous stream substantially constant as it passes through said isothermal section while simultaneously increasing the temperature of said coolant stream;
   (5) introducing the partially reacted gaseous stream leaving the catalyst in the isothermal section in (3) and at substantially the same exit temperature as from (3) into the water-gas shift catalyst in the equilibrium-limited section and continuing the exothermic water-gas shift reaction of said gaseous stream as it is passed through said equilibrium-limited section in concurrent flow indirect heat exchange with said gaseous coolant as described previously in (1), thereby increasing the temperature of the gaseous coolant stream in (1) while simultaneously gradually reducing the temperature of said reaction gaseous stream to an exit temperature in the range of about 400 to 780° F.; and
   (6) removing the reacted gaseous stream from the catalyst in said equilibrium-limited section as shifted product gas containing an increased amount of hydrogen.

2. The process of Claim 1 wherein the pressure in the adiabatic, isothermal, and equilibrium-limited sections of the water-gas shift conversion zone is substantially the same, less ordinary pressure drop across the catalyst beds.

3. The process of Claim 1 further provided with the step of admixing supplemental $H_2O$ with the preheated gaseous stream leaving the equilibrium section in step (1).

4. The process of Claim 1 wherein said water-gas shift catalyst is selected from the group of catalysts consisting of iron oxide promoted by 1 to 15 percent by weight of an oxide of a metal such as chromium, thorium, uranium, beryllium and antimony; and a catalyst mixture of copper and zinc salts or oxides in a weight ratio of about 3 parts zinc to 1 part copper.

5. The process of Claim 1 where in step (1) said stream of feed gas mixture is introduced into the first heat exchanger in said first section at a temperature in the range of 300 to 620° F. and with a mole ratio ($H_2O/CO$) in the range of about 2 to 5.

6. The process of Claim 1 provided with the steps of introducing $H_2O$ into the second heat exchange unit in step (4) as said coolant thereby producing superheated steam, and including at least a portion of said superheated steam in the unreacted feedstream to obtain a mole ratio ($H_2O/CO$) in the range of about 2 to 5.

References Cited

UNITED STATES PATENTS

| 3,666,682 | 5/1972 | Muenger | 252—373 |
| 2,051,774 | 8/1936 | Kleinschmidt | 23—288 |
| Re. 24,148 | 5/1956 | Garbo | 252—373 |
| 3,440,021 | 4/1969 | Niedetzky et al. | 23—289 |
| 3,499,797 | 3/1970 | Hooper | 423—656 |
| 2,747,967 | 3/1956 | Markert et al. | 423—437 |
| 3,128,163 | 4/1964 | Weittenhiller et al. | 48—197 R |
| 2,829,113 | 4/1958 | Barry et al. | 252—376 |
| 3,466,152 | 9/1969 | Yamamoto et al. | 23—289 |
| 1,932,247 | 10/1933 | Kniskern | 23—289 |
| 3,303,001 | 2/1967 | Dienes | 423—656 |
| 3,397,962 | 8/1968 | Squires | 252—373 |
| 3,355,249 | 11/1967 | Squires | 423—656 |
| 2,892,693 | 6/1959 | East | 48—196 |

HOWARD T. MARS, Primary Examiner

U.S. Cl. X.R.

23—288 L; 423—655, 656